Aug. 31, 1965   A. J. JONES ETAL   3,203,281
TOOL PATH CONTROL MECHANISM
Filed Feb. 25, 1963   3 Sheets-Sheet 1
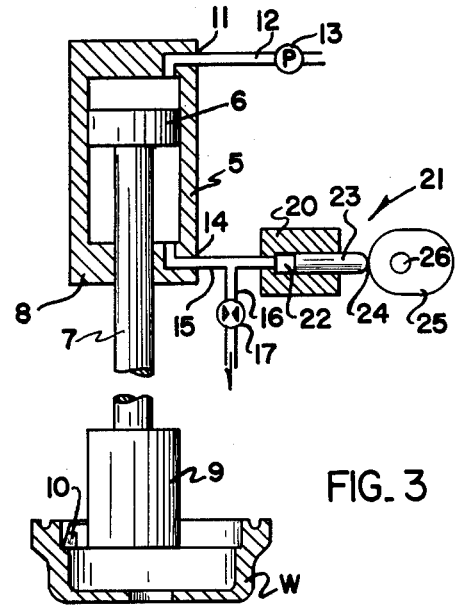
INVENTORS
ALVIN J. JONES
PETER E. FORSTER
BY
Oberlin, Maky & Donnelly
ATTORNEYS Aug. 31, 1965    A. J. JONES ETAL    3,203,281
TOOL PATH CONTROL MECHANISM
Filed Feb. 25, 1963    3 Sheets-Sheet 2

INVENTORS
ALVIN J. JONES
PETER E. FORSTER
BY
Oberlin, Maky & Donnelly
ATTORNEYS

United States Patent Office 3,203,281
Patented Aug. 31, 1965

3,203,281
TOOL PATH CONTROL MECHANISM
Alvin J. Jones, Gates Mills, and Peter E. Forster, Cleveland, Ohio, assignors to The Motch & Merryweather Machinery Company, Cleveland, Ohio, a corporation of Ohio
Filed Feb. 25, 1963, Ser. No. 260,478
3 Claims. (Cl. 77—1)

This invention relates generally as indicated to a tool path control mechanism and more particularly to a pulse generator for a hydraulic tool feed mechanism.

In the boring of brake drums and the like, it has been found desirable that the uniform lead of the cutting tool, normally forming a microscopic screw thread, be modified to prevent axial thrust from being imparted to the engaging brake shoes. This axial thrust resulting from the microscopic screw threads creates a harmful effect known in the art as "brake slap." Similarly, retention of lubricants in most machinery is accomplished by a sealing member against a rotating shaft. Microscopic screw threads on the shaft caused by turning the shaft on a lathe tend to pump the lubricant out through the seal and, of course, also cause rapid seal wear. Normally, a costly grinding or honing process is required for the shaft to prevent such leakage and wear.

It is therefore one main object of the present invention to provide a tool control mechanism for the boring of brake drums and the like which will modify the uniform lead of the cutting tool to prevent the formation of a microscopic screw thread.

In workpieces, such as the aforementioned brake drums, a certain surface finish is generally required. For example, brake drums usually have a surface finish of from 90–130 microinches. The finish specifications for other workpieces vary widely. Heretofore, the finish obtained has been a function of the production rate. By slowing the feed rate of the tool, a smoother finish results. A slower feed rate, however, means a slower production rate. With the tool path control mechanism of the present invention, it has been found that the finish of the product is no longer tied to the production rate.

It is accordingly another main object to provide a tool path control mechanism whereby the finish obtained is no longer solely a function of the tool feed rate.

In the turning of brake drums, the slide of the tool is usually set at a false angle to compensate for what is known as taper. This is apparently due to the pressure of the tool. It has been discovered that the present invention no longer requires such angulation of the slide and workpiece and, moreover, produces a rounder workpiece.

It is then a further object to provide a tool control mechanism which will facilitate the production of higher quality workpieces.

It is a still further object to provide a tool control mechanism for the boring of brake drums and the like or the turning of shafts which will impart a series of waves with both forward and reverse slope within each cutting revolution so as to preclude the formation of a microscopic screw thread and the undesirable results thereof.

In modern automated machine tooling, one of the major problems encountered is the removal of the chip created by the cutting tool. As the tool is uniformly fed into a rotating workpiece, a helical chip of considerable length is produced. This helical chip cannot readily be flushed away by air or liquid and generally requires to be manually removed.

It is accordingly still another object of the present invention to provide a tool control mechanism which will produce a broken or discontinuous chip permitting the same readily to be flushed away.

Yet another object is to provide a mechanism capable of applying a controlled modification to the relatively uniform feed rate of hydraulic cylinders.

A yet further object is the provision of a hydraulic pulse generator producing a pulse having a controlled frequency and amplitude.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a fragmentary vertical section of a prior art drum illustrating on a somewhat exaggerated scale the microscopic screw threads formed therein;

FIG. 2 is a view similar to FIG. 1 showing exaggerated the series of waves with both forward and reverse slope which may be imparted to the work with the present invention;

FIG. 3 is a schematic sectional view of one form of the present invention utilizing a variable rise cam;

FIG. 4 is a fragmentary sectional view of a further form of the present invention utilizing a wobble plate and follower piston to create the controlled pulse;

FIG. 5 is a fragmentary transverse sectional view of another modification of the present invention utilizing a variable rise cam and rocker arm to control the pulse;

FIG. 6 is a longitudinal sectional view of the FIG. 5 embodiment taken on the line 6—6 thereof;

Figure 7:
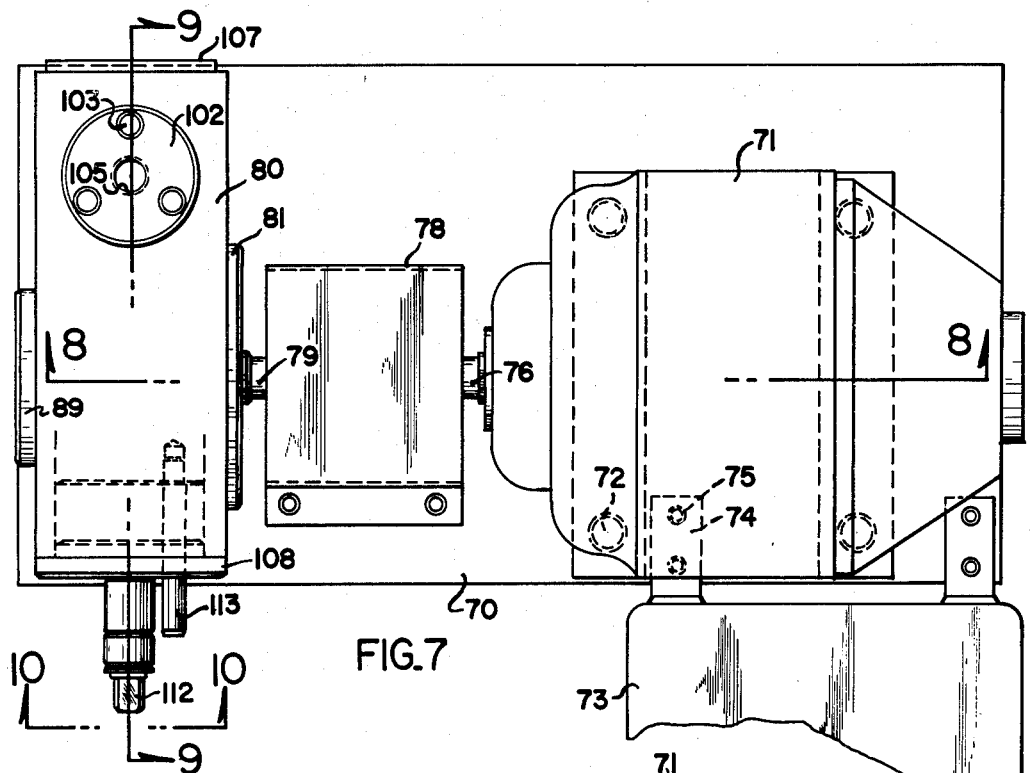
FIG. 7 is a top plan view of a similar form of pulse generator unit utilizing an eccentric for creating the pulse.

Referring now to the annexed drawings and more particularly to FIGS. 1 and 2, there is shown a prior art drum 1 in FIG. 1 having microscopic screw threads on the interior thereof at 2. The microscopic screw threads are obtained by a uniform feed rate of the cutting tool and the micro finish obtained is a function of such feed rate. However, with the present invention, the finish obtained is now a function of the frequency of the controlled pulse of the tool path control mechanism and the feed rate. As seen in FIG. 2, the drum 3 has an interior finished surface 4, shown exaggerated, formed of a microscopic series of waves having both forward and reverse slope within each cutting revolution. No longer present is the microscopic screw thread formed with a uniform feed rate and, moreover, the finish obtainable is now a function of the wave frequency in addition to the feed rate.

Referring now to the embodiment of the invention shown in FIG. 3, there is provided a hydraulic feed cylinder 5 having a piston 6 therein connected to a rod 7 extending through the end 8 of the cylinder and connected to a tool holder or slide 9. A cutting tool 10 mounted on the tool holder or slide 9 engages a workpiece W, illustrated as in the form of a brake drum, which may be mounted on a chuck of a lathe or other similar machine tool and the workpiece is thus turned about its own axis as the tool 10 is fed longitudinally of the workpiece to mill or cut away the same. In normal practice, the axis of rotation of the workiece W and the axis of longitudinal movement of the slide 9 will not be parallel to compensate for the aforementioned taper. Further, in normal practice, it will be understood that a continuous helical chip will be produced by the cutting tool 10 if the feed rate of such tool is uniform.

The blinde end of the cylinder 5 is provided with an opening 11 connected to a fluid line 12 which leads to a hydraulic pump 13 or other suitable source of hydraulic pressure. Hydraulic fluid under pressure is then forced into the blind end of the cylinder 5 to cause the piston 6 to move downwardly as seen in FIG. 3 and hydraulic fluid in the rod end of the cylinder will be forced through opening 14 into exhaust line 15. In such exhaust line, there is provided a T having a branch 16 connected to a flow regulator 17 and leading back to a hydraulic drain or reservoir. The feed rate of the tool 10 is controlled by means of the flow regulator 17 and it can be seen that the more fluid that is permitted to escape through the line 16, the faster the feed rate.

The line 15 is also connected to the body 20 of an hydraulic pulse generator unit shown at 21. The line 15 is in fluid communication with a cylindrical chamber 22 within the body 20 of the pulse generator and a piston or plunger 23 is mounted in such chamber for reciprocation therein. Such plunger is provided with a rounded nose 24 in contact with a variable rise cam 25 mounted on rotatable shaft 26. The exhaust pressure of the hydraulic fluid will then enter the chamber 22 and maintain the piston or plunger 23 pressed firmly against the periphery of the cam 25. Rotation of the cam will then cause the plunger 23 to reciprocate within the bore or chamber 22 creating a hydraulic pulse in the exhaust side of the feed cylinder 5. It will readily be understood that the cam 25 may be an eccentric creating a harmonic pulse or a variable rise cam with the profile controlling the rise, dwell and decay of the generated pulse. The shaft 26 which may be driven by a variable speed motor at a variable speed will then be employed to control the frequency of the generated pulse.

Under operating conditions, the displaced volume of the chamber 22 added to or subtracted from the otherwise uniformly varying volume of the exhaust side of the connected cylinder thereby modifies the rate of advance of the hydraulic piston of the application device. Preferably, at least one pulse wave will be created for every revolution of the workpiece and it is desirable that the revolution of the workpiece and the rotating cam 25 be not in synchronism so that a broken chip will occur either slightly more frequently than one revolution of the workpiece or slightly less frequently than one revolution. Also, it is not desirable to form a standard pattern on the workpiece. For example, the cam may be driven at 1440 c.p.m., the spindle or workpiece may be driven at 525 r.p.m., creating a pulse having an amplitude of .006 inch, and with a feed rate of .012 inch per revolution, a desired finish is obtained for the workpiece which will not include the microscopic screw threads otherwise formed.

It will readily be understood that the operation of the feed cylinder 5 may be reversed so that the tool 10 will be cutting on an up stroke and in such situation, the unit 21 will be mounted in the line 12 coming from the blind end of the cylinder 5 which is then the exhaust side of such cylinder.

FIG. 4 illustrates a slight modification of the FIG. 3 embodiment wherein the generator body 30 has mounted therein the piston 31 for reciprocation in the bore 32 and such is driven by a wobble plate 33 mounted on shaft 34 extending through bearings 35 and 36 in bracket 37 which also mounts the generator body 30. The shaft 34 may be coupled at 38 to the shaft of a variable speed motor 39 which can then be utilized to control the frequency of reciprocation of the plunger 31. The hydraulic fluid in chamber 32 which is connected to the exhaust side of the feed cylinder is sufficient to maintain the plunger 31 in contact with the wobble plate 33. Again, the wobble plate may be selected to control closely the amplitude and curvature of the pulse with the motor 39 controlling the frequency of such pulse.

Referring now to the embodiment of the invention shown in FIGS. 5 and 6, there is seen a mechanical pulse generator similar to that shown in FIG. 3 but employing a separate means to adjust the amplitude of the generated pulse without necessitating a replacement of the cam. The pulse generating cam 40 is mounted on shaft 41 supported in bearings 42 and 43 of mounting bracket 44. Such bracket may also support a variable speed motor, not shown, driving the shaft 41 through coupling 46. Also mounted on the bracket is a generator body 47 having a bore 48 therein supporting for reciprocation the plunger piston 49. The bore chamber 48 is, of course, connected to the line 15, seen in FIG. 3, in turn connected to the exhaust side of the feed cylinder through the tapped opening 50.

Instead of the projecting end of the plunger 49 being in direct contact with the variable rise cam 40, it contacts one end 51 of rocker arm 52 which is pivoted near its middle at 53 to a longitudinally adjustable support 54. Such support 54 may be slide guided in ways or the like between the parallel projecting portions 55 and 56 of the bracket 44 which also support, respectively, the bearings 42 and 43. An adjusting screw 57 is threaded into the body of the support member 54 and extends through a collar 58. Such screw 57 is provided with a head 59 which may be exposed and readily accessible for application of a wrench or other suitable adjusting tool. The screw 57 rotates freely in the collar 58, but is axially fixed therein and the collar is, of course, secured to the bracket 44. The opposite end 60 of the rocker arm 52 is in contact with the variable rise cam 40 as shown at 61 and such contact is maintained by the fluid pressure in the bore chamber 48 maintaining the plunger 49 against the other end 51 of the rocker arm. Accordingly, it can be seen that the movement of the pivot axis 53 toward the axis of the shaft 41 by manipulation of the screw 57 will increase the amplitude of reciprocation of the plunger 49. As the length of the rocker arm between the contact 61 and the pivot 53 is increased, the amplitude of reciprocation of the plunger and thus the pulse is decreased. Thus, the amplitude of the pulse may be controlled without replacing the cam 40 and again, the frequency of the pulse may be controlled simply by the frequency of rotation of the shaft 41.

A slightly more sophisticated and preferred form of the present invention is illustrated in FIGS. 7 through 10. The pulse generating unit illustrated in such embodiment may be mounted on a plate 70 and includes a variable speed motor 71 supported on such plate by suitable fasteners 72. Adjacent the motor 71 is a speed Variator 73 which can be employed in the conventional manner closely to control the speed of rotation of the motor. The speed Variator may be mounted adjacent the motor on plate 70 by means of brackets 74 and suitable fasteners 75 shown more clearly in FIG. 9. The output shaft 76 of the motor 71 is connected by coupling 77 in housing 78 is to pulse generator drive shaft 79.

The pulse generator shaft 79 extends into a housing 80 through a circular access plate 81. A ball bearing 82 mounted in such access plate supports the shaft 79 for rotation therein. Adjacent the bearing 82, the shaft 79 is provided with a shoulder 83 against which shoulder there is mounted on eccentric portion 84 a bearing 85 for eccentric member 86. The distal end 87 of the shaft 79 is mounted in bearing 88 in a circular aperture in the housing 78 to a pulse generator drive shaft 79.

Figure 9:
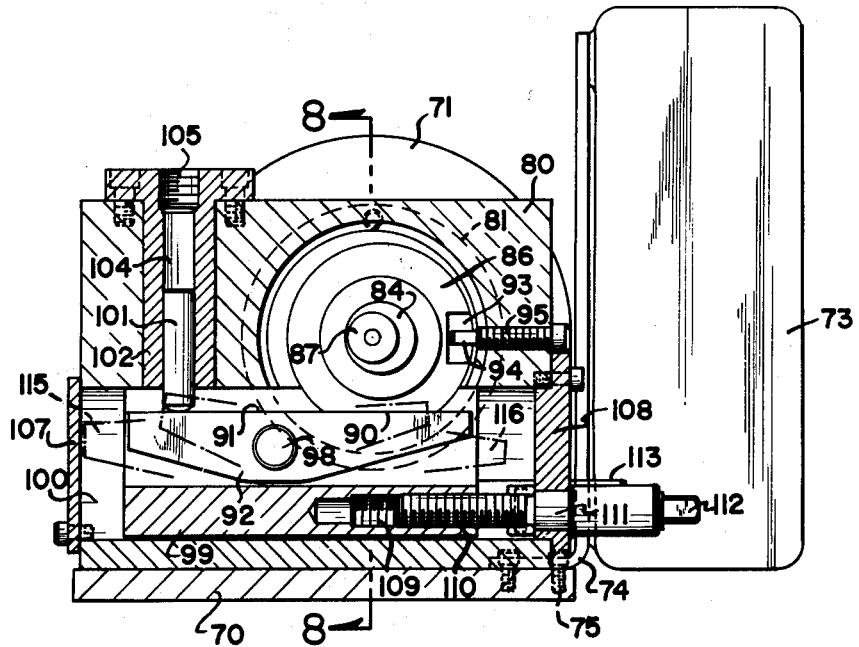
FIG. 9 is a transverse sectional view of such unit taken on the line 9—9 of FIG. 7.

The eccentric member 86 is provided with a flat surface 90 in contact with the flat top surface 91 of rocker arm 92. The eccentric member 86 is also provided with a cutout or notch 93 and the end 94 of a stop screw 95 is situated within such notch limiting oscillation of the eccentric member about the axis of the shaft 79. The stop screw may be threaded in the housing 80 as indicated in FIG. 9.

Figure 8:
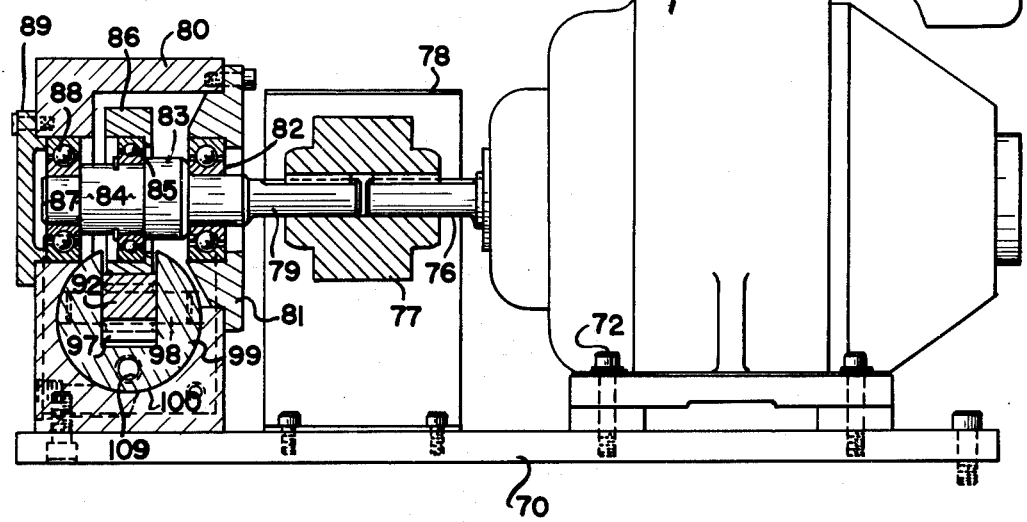
FIG. 8 is a horizontal sectional view of such unit taken on the line 8—8 of FIGS. 7 and 9.

The rocker arm 92 may be similar to that shown in the FIG. 6 embodiment and is mounted by suitable needle bearings 97 on pin 98 extending through such rocker arm and the sides of cylindrical support member 99 mounted in cylindrical way 100 of the housing 80 as seen more clearly in FIG. 8. The flat 90 of the eccentric member 86 engages the rocker arm 92 on one side of the pivot 98 and the plunger 101 mounted in cylindrical insert body 102 engages the top surface 91 of the rocker arm 92 on the opposite side of the pivot 98. The insert body 102 is mounted in the body 80 and suitable fasteners 103 may be employed to hold the body thereto. Such insert body 102 is provided with a bore 104 receiving the plunger 101 and forming a chamber for the hydraulic fluid which may be connected by means of the tapped opening 105 to the exhaust side of the feed cylinder.

Figure 10:
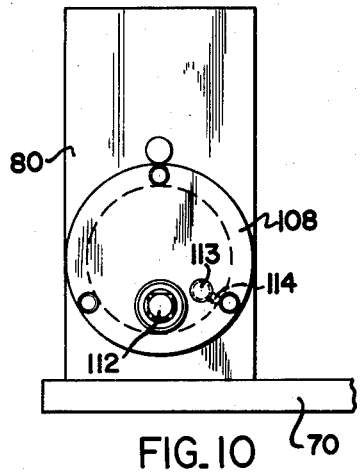
FIG. 10 is a fragmentary partial end elevation taken on the line 10—10 of FIG. 7

The cylindrical way 100 in the body 80 is closed at one end by access plate 107 and at the opposite end by a somewhat larger access plate 108. A longitudinally extending threaded aperture 109 in the adjustable slide 99 has an adjusting screw 110 threaded therein which includes a smooth cylindrical portion 111 extending through the access plate 108. The adjusting screw 110 is thus axially confined and yet freely rotatable with respect to the plate 108. The adjusting screw projects therethrough and is provided with a head 112 for application of a suitable adjusting tool. In this manner, the longitudinal position of the slide 99 may be adjusted in the way 100 and thus the axis of the pivot 98 may be adjusted with respect to the contacts between the rocker arm and the plunger 101 and the rocker arm and the eccentric member 86. A rod 113 may also be mounted on the slide 99 by means of a suitable set screw or the like 114 as seen in FIG. 10 and projects through the plate 108 providing a visual indication of the position of the slide.

In operation, the shaft 79 of the unit will be driven at a varying speed, depending upon the setting of the speed Variator 73 and such will cause the eccentric member 86 to oscillate about the axis of shaft 79 to the extent of the throw of the eccentric portion 84 thereof. Since the hydraulic fluid under pressure in the chamber 104 will maintain the plunger 101 in contact with the arm 92, such arm will be pivoted forcefully in a counterclockwise direction as seen in FIG. 9 to maintain the top surface 91 of the arm and the flat 90 of the eccentric member in contact. The slot 93 and the tip 94 of the screw 95 will permit limited oscillation of the eccentric member on the bearing 85, but, of course, will preclude rotation of the eccentric member around such bearing. As indicated by the dotted line positions 115 and 116 for the rocker arm 92, the pivot axis 98 thereof may be substantially longitudinally adjusted to control the amplitude of the generated pulse. In the 116 position, the extent of reciprocation of the plunger 101 may be increased when the adjusting screw 110 moves the support or slide 99 to the right as seen in FIG. 9. Conversely, the extent of reciprocation may be decreased when the pivot 98 is moved to the left in FIG. 9. Thus it will be seen that the amplitude of the pulse may be controlled without replacing or changing the eccentric throw of the drive mechanism. Again, the frequency of the pulse is controlled simply by the speed of rotation of the motor 71.

Although variable speed motors are illustrated as rotating the shaft for the mechanical pulse generators, it will be understood that gearing, belting or the like, from an existing rotating member of the application device, may equally well be employed.

The present invention then provides:

(1) A workpiece not having microscopic screw threads normally provided by a uniform feed rate, but having generated waves thereon with both forward and reverse slopes;

(2) A discontinuous chip which can easily be flushed away in automated machine tool applications;

(3) A truer and more round workpiece without the requirement that the slide be set at a false angle due to the lack of a continuous tool-workpiece pressure;

(4) A controlled workpiece finish no longer solely a function of the feed rate of the tool and thus the production rate.

Other modes of applying the principle of the invention may be employed, change being made as regards the details described, provided the features stated in any of the following claims or the equivalent of such be employed.

We, therefore, particularly point out and distinctly claim as our invention:

1. In a hydraulic feed piston-cylinder assembly for cutting tools and the like; a hydraulic pulse generating unit comprising a chamber connected to the exhaust side of said cylinder, a piston reciprocably mounted in said chamber, a rocker arm engaging said piston, drive means operative to oscillate said rocker arm thus to reciprocate said piston, said drive means comprising a motor driven shaft, an eccentric on said shaft, an eccentric member surrounding said eccentric on said shaft and including a flattened portion engaging said rocker arm to oscillate the same, means operative to vary the speed of said motor driven shaft to vary the frequency of reciprocation of said piston and thus the generated pulse, support means for said rocker arm, and means operative to adjust the position of said support means to control the amplitude of reciprocation of said piston and thus the amplitude of the generated pulse.

2. In a hydraulic feed piston-cylinder assembly for cutting tools and the like, a source of hydraulic fluid under pressure connected to one end of said assembly, an exhaust line leading to a hydraulic drain connected to the other end of said assembly, a flow regulator in said exhaust line operative to obtain a relatively uniform feed rate for said assembly, a fluid chamber connected to said exhaust line ahead of said fluid regulator, and means operative to vary the volume of said chamber to modify the relatively uniform feed rate of said assembly comprising a piston projecting into said chamber, a rotating member operative to cause said piston to reciprocate into and out of said chamber, means to vary the speed of said rotating member operative to vary the frequency of reciprocation of said piston, said reciprocating drive means comprising a variable rise cam, a rocker arm extending between said piston and cam, and means operative to adjust the position of said rocker arm to control the amplitude of movement of said piston.

3. In a hydraulic feed piston-cylinder assembly for cutting tools and the like, a source of hydraulic fluid under pressure connected to one end of said assembly, an exhaust line leading to a hydraulic drain connected to the other end of said assembly, a flow regulator in said exhaust line operative to obtain a relatively uniform feed rate for said assembly, a fluid chamber connected to said exhaust line ahead of said fluid regulator, and means operative to vary the volume of said chamber to modify the relatively uniform feed rate of said assembly comprising a piston projecting into said chamber, a rotating member operative to cause said piston to reciprocate into and out of said chamber, means to vary the speed of said rotating member operative to vary the frequency of reciprocation of said piston, said reciprocating drive means comprising an eccentric, a rocker arm extending between said piston and eccentric, and means operative to adjust the position of said rocker arm to control the amplitude of movement of said piston.

References Cited by the Examiner

UNITED STATES PATENTS

| | | | |
|---|---|---|---|
| 2,350,117 | 5/44 | Kline | 60—54.5 |
| 2,418,841 | 4/47 | Karweit | 91—429 |
| 2,634,756 | 4/53 | Anderson | 91—429 X |
| 2,830,455 | 4/58 | Harmon | 103—38 |
| 2,925,002 | 2/60 | Finley et al. | 77—33.5 |
| 2,950,684 | 8/60 | Bauerlein et al. | 103—38 |
| 2,972,894 | 2/61 | Bennett | 103—38 |

WILLIAM W. DYER, Jr., *Primary Examiner.*

J. S. OVERHOLSER, *Examiner.*